United States Patent [19]

Dale et al.

[11] Patent Number: 5,012,513
[45] Date of Patent: Apr. 30, 1991

[54] TELEPHONE HANDSET COVER

[75] Inventors: George L. Dale, P.O. Box 3526, Lacey, Wash. 98503; Robert E. Brown, Olympia, Wash.

[73] Assignee: George L. Dale, Lacey, Wash.

[21] Appl. No.: 388,245

[22] Filed: Aug. 1, 1989

[51] Int. Cl.$^5$ ............................................. H04M 1/00
[52] U.S. Cl. .................................. 379/451; 379/433; 379/447; 379/440
[58] Field of Search ................ 379/451, 433, 440, 441, 379/447, 450

[56] References Cited

U.S. PATENT DOCUMENTS

| | | | |
|---|---|---|---|
| 1,425,977 | 8/1922 | Kiesel | 379/440 |
| 2,050,097 | 8/1936 | Kalenoff | 379/447 |
| 2,064,435 | 12/1936 | Loeffler | 379/433 |
| 2,226,959 | 12/1940 | Zimmerman | 379/433 |
| 2,554,081 | 5/1951 | Allen et al. | 379/447 |
| 2,575,280 | 11/1951 | Long | 40/336 |
| 3,012,108 | 12/1961 | Bell | 379/447 |
| 3,962,555 | 6/1976 | Efaw | 379/451 |
| 4,736,418 | 4/1988 | Steadman | 379/451 |

FOREIGN PATENT DOCUMENTS 586492 3/1977 Switzerland ..................... 379/451

OTHER PUBLICATIONS

Metro Tel Corporation Test Equipment, Lineman's Handset Model 1011-2 pages.

Primary Examiner—Jin F. Ng
Assistant Examiner—Jason Chan
Attorney, Agent, or Firm—David L. Garrison

[57] ABSTRACT

A telephone handset cover 10 for covering a conventional telephone handset 1, typically of the type employed in public telephone facilities. Handset cover 10 is installed upon handset 1 with or without shank 16. Shank 16 may be a single piece or a plurality of pieces. Where employed, shank 16 may be separate from cover 10 or integrally molded there into, and serves to hold handset 1 together for continuous function even in the event of breakage of handset 1. In general handset cover 10, and shank 16 function to absorb or deflect impact energy directed at handset 1 to prevent damage to, or contain the damage done to, telephone handsets in public telephone facilities. Handset cover 10 is typically nonremovable by the user, in that it is installed either with temporary epoxy glue strips 15 or with angled metal closure shanks 26. Handset cover 10 may be closed either along the back of handset 1 or along the cradle side of handset 1.

21 Claims, 5 Drawing Sheets

TELEPHONE HANDSET COVER

TECHNICAL FIELD

The invention relates to a cover for protecting a conventional telephone handset from damage due to impact, and, where such damage may nevertheless occur from particularly severe abuse, for preserving the structural integrity and function of the handset even if the handset structure itself has been broken inside the cover. More particularly, the invention relates to a telephone handset cover for a public telephone.

BACKGROUND OF THE INVENTION

Breakage and loss of service on public telephone handsets is very costly both in maintenance and repair costs to the telephone company service provider and to the public in loss of use of public telephone facilities. Every year, in the United States alone, 2-2.5 million telephone handset repairs or replacements become necessary as a result of what is usually intentional damage or vandalism to a public telephone handset. These repairs cost telephone server providers upwards of $200.00 per service call, or approximately half a billion dollars annually. This cost figure represents both real and intangible costs, such as repair costs, lost revenues, and lost goodwill and customer confidence (a public telephone user will typically avoid returning to a booth that was "out of order" the last time it was visited).

Some of the ways in which telephone handsets are damaged are (1) separation of the handset cable from the transmitter end of the handset, usually caused by a sudden forceful yank or jerk to the handset either as an intentional act of vandalism or as a spontaneous act of frustration; (2) breakage of the receiver or transmitter end of the handset or of the handgrip portion of the handset as a result of a hammering blow with the handset to some other part of the public phone apparatus or enclosing structure. As a result of either kind of damage, the handset operation is typically either severely impaired or broken off entirely, thus placing that particular public phone out of service.

There are no handset covers presently known which address and ameliorate the above identified problems. A particular design of handset is known, which was developed for use aboard warships in World War II, where a cushioning material is integrally designed as part of the handset, although the primary purpose of the cushioning was to protect the user and not the handset. However, this cushion design is not adaptable to installation over a conventional modern telephone handset. Handset covers are also known for achieving both decorative and/or sanitary purposes, or for achieving a minor degree of protection from such household hazards as stains and nicks to the surface of the telephone handset. However none of these devices are designed or adaptable to the purpose of quick and semipermanent installation upon a public phone handset which can be the object of intentional or unintentional harsh physical abuse, and none of them are capable of preventing breakage to the handset parts or preserving the integrity of the handset as a functional unit even if the handset parts do become broken.

DISCLOSURE OF THE INVENTION

Accordingly it is an object of the invention to provide a telephone handset cover which protects handsets, particularly on pay or public telephones, from vandalism and which holds down the costs of constant repairs to phones in high risk areas.

It is a further object of the invention to provide a handset cover which is reusable, washable, weather resistant, and which does not change the normal use of the conventional handset.

It is another object of the invention to provide a handset cover which can be simply and inexpensively manufactured.

It is a further object of the invention to provide a handset cover which can be quickly, durably, and permanently installed on a handset such that only maintenance personnel can remove the handset cover for maintenance purposes.

These and other objects of the invention which will become apparent herein are accomplished by an apparatus in the form of a telephone handset cover. This cover is fashioned generally from an impact energy absorbing material. Preferably an outer surface of this impact energy absorbing material is durable and resistant to puncture, abrasion, and tearing. Multiple layered materials may be employed with the impact energy absorbing function being fulfilled by means of some kind of conventional padding or batting, all of which is then covered by a durable skin or outer cover, but preferably a moldable rubber type of material is employed which, when shaped to fit the telephone handset, acts to absorb impact energy directed to those portions of the telephone handset deemed most likely to suffer abuse from such impacts. In preferred embodiments the preferred impact energy absorbing material is a molded NEOPRENE foam rubber. The cover may be fashioned more or less in a single pour by the use of appropriate conventional injection molding techniques to fit the shape of a conventional telephone handset. Alternately, it is contemplated that the telephone handset cover of the invention may be fashioned by piecing together pieces of foam rubber which have already been formed and cut from sheet stock.

The telephone handset cover of the invention may, as indicated briefly above, be made to cover all of the telephone handset cover, or may be made to cover only those portions of the telephone handset deemed most likely to receive abuse from impact. Typically, the hand grip portion of the handset and two ends of the handset receive the most abuse and are most susceptible to that abuse, especially from hammering type blows. Accordingly, it is contemplated that some embodiments will not cover the entire telephone handset. In such embodiments, it will not be necessary that the type of energy absorbing material, whether or not that is a foam type rubber, need not be the same for the hand grip portion of the cover as for one or both of the two endcover portions of the cover. For instance the handgrip portion of the handset may be covered by a NEOPRENE brand rubber and the endcovers of the handset cover may advantageously be made of some other moldable foam rubber, moldable in a thickness and shape such as to further protect the receiver and transmitter ends of the telephone handset with more cushioning. Where other materials are employed in a handset cover, such as natural and synthetic fiber batting or padding, it is expected that impact energy will still be absorbed, but to less effect and with less durability and less cost effectiveness.

The handset cover of the invention is an integral somewhat stretchable unit, although described herein for ease as several parts, such as grip cover, endpiece, etcetera. It is quickly and easily installed on a handset in a manner not much more complicated than putting on a pair of rubber galoshes over a pair of shoes. It is then fastened around the handset with either epoxy glue or with other fasteners as more particularly described herein in such a way that the fasteners cannot lightly or easily be undone by users of the handset, but which can be undone by maintenance personnel without great difficulty.

The handset cover of the invention is most effective, especially in high risk areas, where the handset cover covers substantially all of the handset, at least those portions which may be subjected to high impact; however it is not necessary in the practice of the invention that the handcover cover any more of the handset than can reasonably be expected to be exposed to impact forces.

The invention apparatus also contemplates the use of an integral clamp in one of the endcovers for the purpose of clamping onto the conventional coiled cover of the telephone handset cable so that a sharp and forceful pull on the handset will not separate the cable from the handset but instead will tend to transmit the force of the pull on the handset down the cable.

It is also contemplated that for areas of moderate to high risk of damage to the telephone handset, a reinforcing and impact absorbing or impact deflecting shank will be made a part of the handset cover. This may in some embodiments be one piece, and in other embodiments be comprised of a plurality of shank pieces. In addition to absorbing or deflecting impact energy the shank, whether one piece or many, also serves, in the event that the impact is so severe as to break the handset, to reinforce and hold the handset together and allow it to remain in service, despite a blow which would otherwise have disabled the handset from service.

The shank, or the shank pieces, will typically cover the back of the spine of the handset cover to protect against reverse hammering blows, and additional shank material or shank pieces can also protect the cradle side of the handset to maximize the above described reinforcing function. In addition the shank or shank pieces may also cover or wrap around the end portions of the handset to further protect the ends of the transmitter and receiver ends of the handset.

In some embodiments the shank pieces employed to protect the cradle side of the handset grip portion have integral folded gripping edges formed therein to provide not only shank protection but also a secure means of attaching the cover to the handset. The shank or shank pieces may be comprised of a molded piece of fiberglass or some such equivalent material having such a composition as to absorb the energy of an impact or to tend to deflect it. This shank material may also be comprised of the well known copolymer ABS or of some sheet steel or aluminum product which is shaped and formed to fit the shape of a conventional handset.

In preferred embodiments which employ an integral molded NEOPRENE handset cover, this shank or shank pieces are molded into the cover during the molding process so that installation of the cover is simply a matter of slipping the handset into the cover and fastening the cover flaps. However it is contemplated that an equally functional handset cover may be fashioned by inserting loose shank pieces into the handset cover while it is being installed onto the handset as long as the shank pieces are installed in the correct locations.

In one embodiment of the invention a rubber lip, or preferably a conventional O-ring, may be molded into the endcovers of the handset cover so as to engage the typically circumferential groove around the two ends of the telephone handset (formed by the juncture of the receiver and transmitter caps on the body of the handset) for the purpose of secure and correct placement of the handset cover upon the handset and also as an aid toward weatherproofing the covered telephone handset.

BEST MODE FOR CARRYING OUT THE INVENTION

Figure 1:
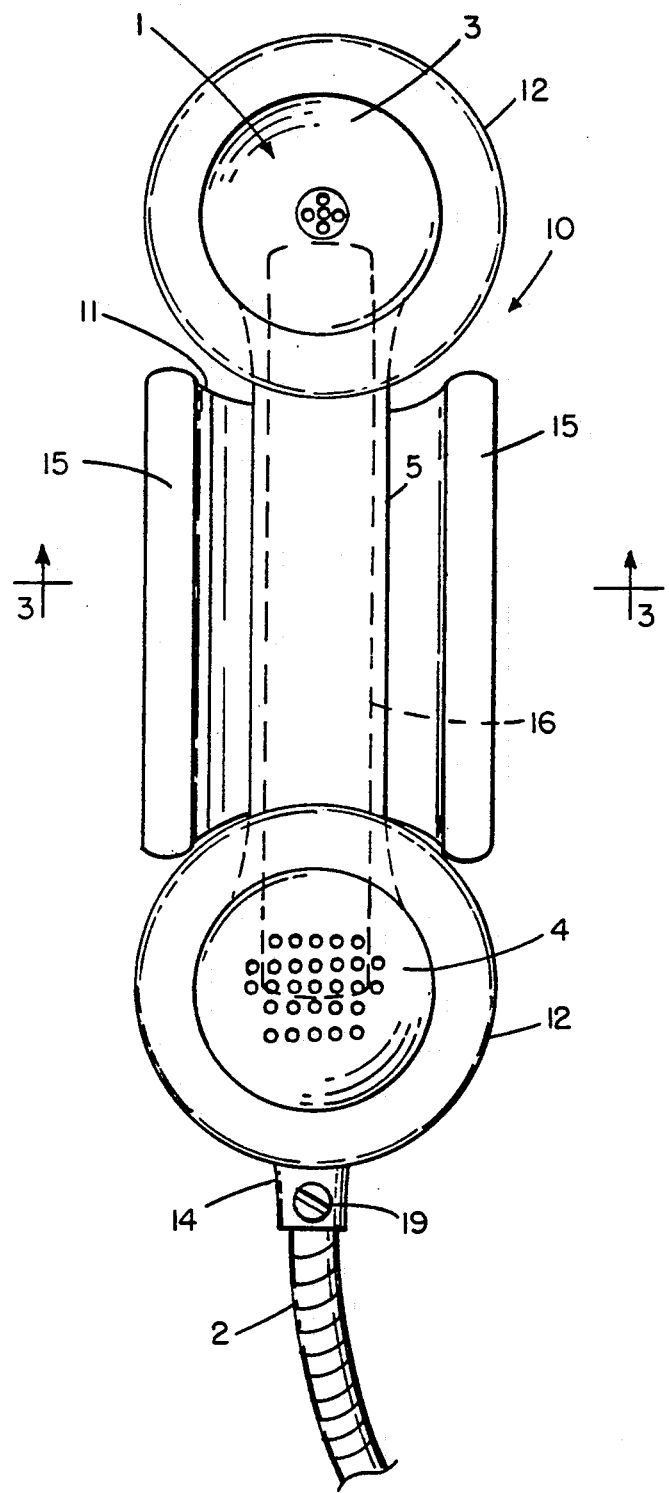
FIG. 1 is a plan view of the handset cover of the invention partially installed upon a conventional handset with receiver and transmitter facing upwards.

Referring now to the drawings wherein like numbers indicate like parts, a first embodiment is illustrated in FIG. 1 for purposes of more particularly disclosing the aspects and features of the invention described above. Conventional handset 1 has handset cable 2, receiver 3, transmitter 4, and handgrip 5. Shown partially installed upon handset 1 is handset cover 10 having grip cover 11 and two endcovers 12. Handset cover 10 is preferably made of some rubber-like, impact energy absorbing material such as, for example, any of a number of moldable foam rubbers, either natural or synthetic, or conventional NEOPRENE brand closed cell flexible rubber of the type from which wet suits are typically made. In a preferred embodiment grip cover 11 is preferably made from a standard sheet thickness of NEOPRENE brand rubber while the endcovers 12 are made from a molded foam rubber. In practice a NEOPRENE brand foam rubber with a thickness of between 1/16" and 3/16" has been found suitable for grip cover 11 and the foam rubber used to make molded endcovers 12 is of the moldable NEOPRENE type, both available from Griffith Rubber Co., Portland, Oreg.

Preferably, endcovers 12 and grip cover 11 are integral to one another to form cover 10. This can be accomplished by molding endcovers 12 around grip cover 11 or by other conventional rubber attaching means such as epoxy. In one embodiment where attractiveness of installation is of greater importance, as for instance in relatively secure, upper class neighborhoods, no backbone or shank 16 is required and the handset cover 10 may be more streamlined by using thinner rubber and making it available in attractive colors coordinated with the decoration scheme of the inside of the phone booth. In all other situations a shank 16, preferably made from a tough and durable fiberglass strip or from spring steel may be made integral to handset cover 10 by attaching it to the inside center portion of grip cover 11 or by specially molding it into grip cover 11 at the time that the material from which grip cover 11 is made is formed.

Where a shank 16 is employed it is not critical that endcovers 12 be integral directly with grip cover 11, but only that endcovers 12 be integral with the ends of shank 16. Preferably most, if not all, of handset 1 is covered by handset cover 10, and no portions of the shank 16 remain exposed. However, since the fundamental purpose of the invention is to prevent damage to, and loss of function of, the handset, even to the point of holding together in one functional piece a completely broken in half handset 1, it is only necessary to cover as much of handset 1 as is necessary to accomplish that purpose. For instance, since ease and effectiveness of installation is also a factor, it may be deemed necessary by those skilled in the art to decrease the width of the handgrip wrapping portions of grip cover 11 in order to facilitate installation. Such a compromise would necessarily expose portions of the handgrip and possibly portions of the receiver and transmitter, but preferably not in a way as to expose those areas of the handgrip and receiver and transmitter most subject to direct contact with destructive forces such as hammering blows of the handset against the surrounding booth structure.

In a preferred embodiment, the endcover 12 which covers transmitter 4 has integrally molded therein a cable sleeve 14 of an otherwise conventional cable clamp type nature such that the handset cable 2, commonly covered by a metal coil, can be securely gripped by set screw 19 upon tightening into sleeve 14. Thus after handset 1 is installed within handset cover 10 and screw 19 is tightened, handset cover 1 cannot be separated from cable 2 at transmitter 4, as any separating force will be transmitted from handset 1 and cover 10 through handset cover 10 and sleeve 14 directly to the cable cover of cable 2.

Figure 3:
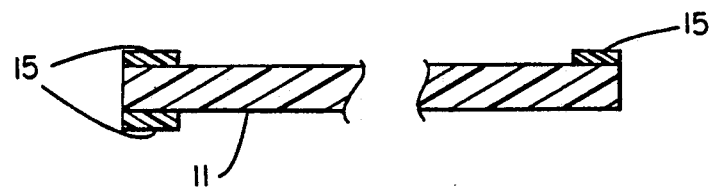
FIG. 3 is a partial sectional view of the handset cover along lines 3—3 of FIG. 1.

Handset cover 10 is installed upon handset 1 as is more particularly described below, and when transmitter 4 and receiver 3 are covered by their respective endcovers 12, final steps are taken to secure the flaps of grip cover 11 around handgrip 5. This may be done in any of several ways, such as by providing grip cover 11 with epoxy glue strips 15 (See also FIG. 3). On the left side of a first flap of grip cover 11 there are glue strips 15 on both top and bottom of the flap and on a right side of grip cover 11 there is one glue strip 15 only on the top of the flap. Thus when the left flap is folded over handgrip 5, a glue strip 15 adheres to the surface of the handgrip and the remaining two glue strips adhere to each other as the right hand flap is folded over the left hand flap. It is contemplated that conventional temporary epoxy glue strips, available from the 3M Company, each strip having a piece of peel away tape, may be used when the cover 10 must be removed for maintenance of the handset 1. This type of epoxy is called "temporary" because it has available an acetone cutting agent for removal of the epoxy so that the handset cover 10 may be removed by maintenance persons but not generally by users, or abusers, of the public telephone.

Figure 2:
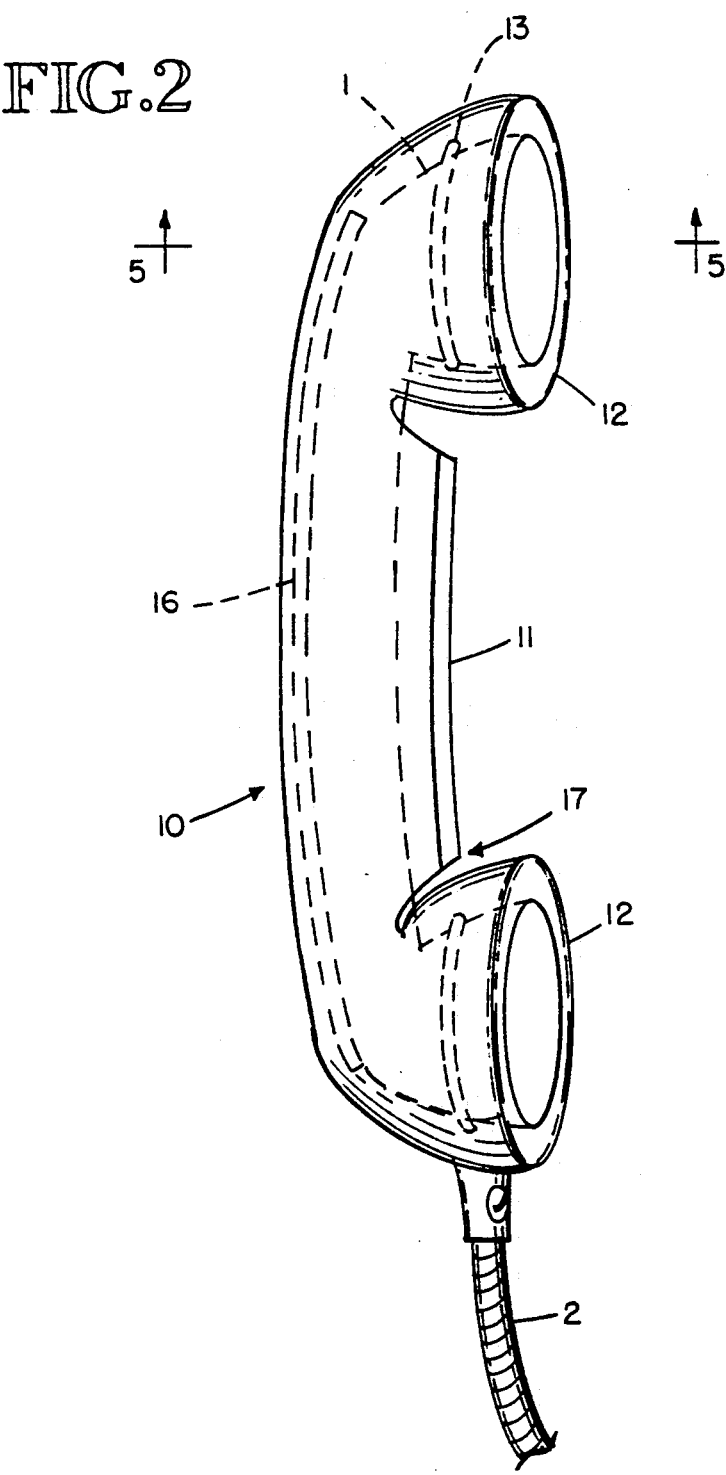
FIG. 2 is a side perspective view of the handset cover of the invention fully installed upon a conventional telephone handset.
Figure 4:
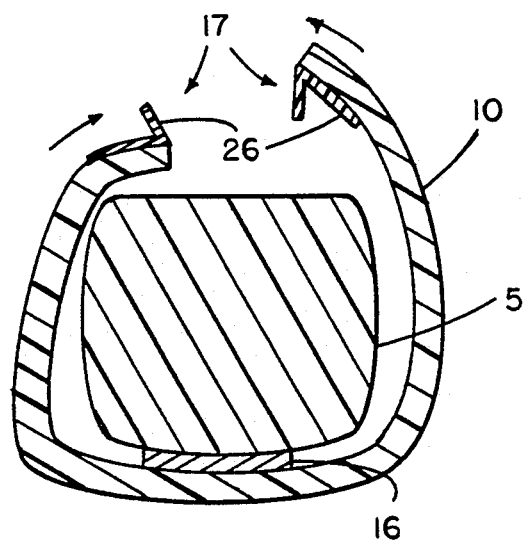
FIG. 4 is a partial section of the invention illustrating an alternative closure.

An alternative closure 17 is illustrated in FIG. 4 as the elements of the closure 17 are about to be stretched and joined. In FIG. 2, closure 17 is shown joined. Where a stretchable grip cover material such as NEOPRENE brand rubber is employed, this closure may be used to good advantage. What will be the outside of the one closure flap of cover 10 and the inside of the other closure flap of cover 10 are equipped with angled closure shanks 26 disposed so that when the closure flap of cover 10 is stretched, the protruding angled portions of each closure shank engage one another and thereby securely hold the flaps together under the tension of the stretched cover 10. The tension of the stretched fabric prevents the flaps from separating under normal use and since it is contemplated that a specialized piece of equipment (not shown), comprising a scissor or plier type mechanism with means (such as pointed "teeth") to engage the material of the cover flaps across most of the width of each flap, will be employed to stretch and attach the flaps and then also to remove them or disattach them for maintenance, it will be most unlikely that users of the phone will be able to do so themselves.

Figure 5:
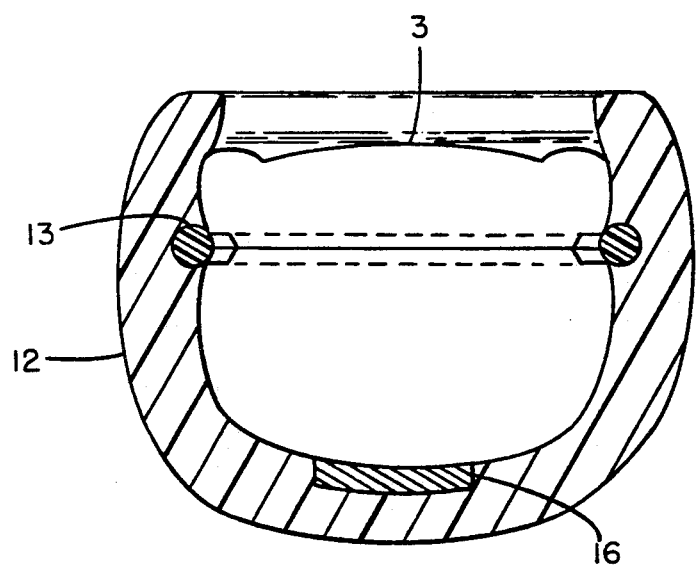
FIG. 5 is a sectional view along lines 5—5 of FIG. 2.

In FIGS. 2 and 5 a preferred way of securing the endcovers 12 to the receiver 3 and transmitter 4 is illustrated. 0-rings 13 are molded into endcovers 12 at the appropriate locations for conventional handset 1 so that as handset 1 is installed into the handset cover 10, the O-rings 13, now integral with endcovers 12, snap into the juncture of the respective receiver and transmitter cap pieces.

Figure 6:
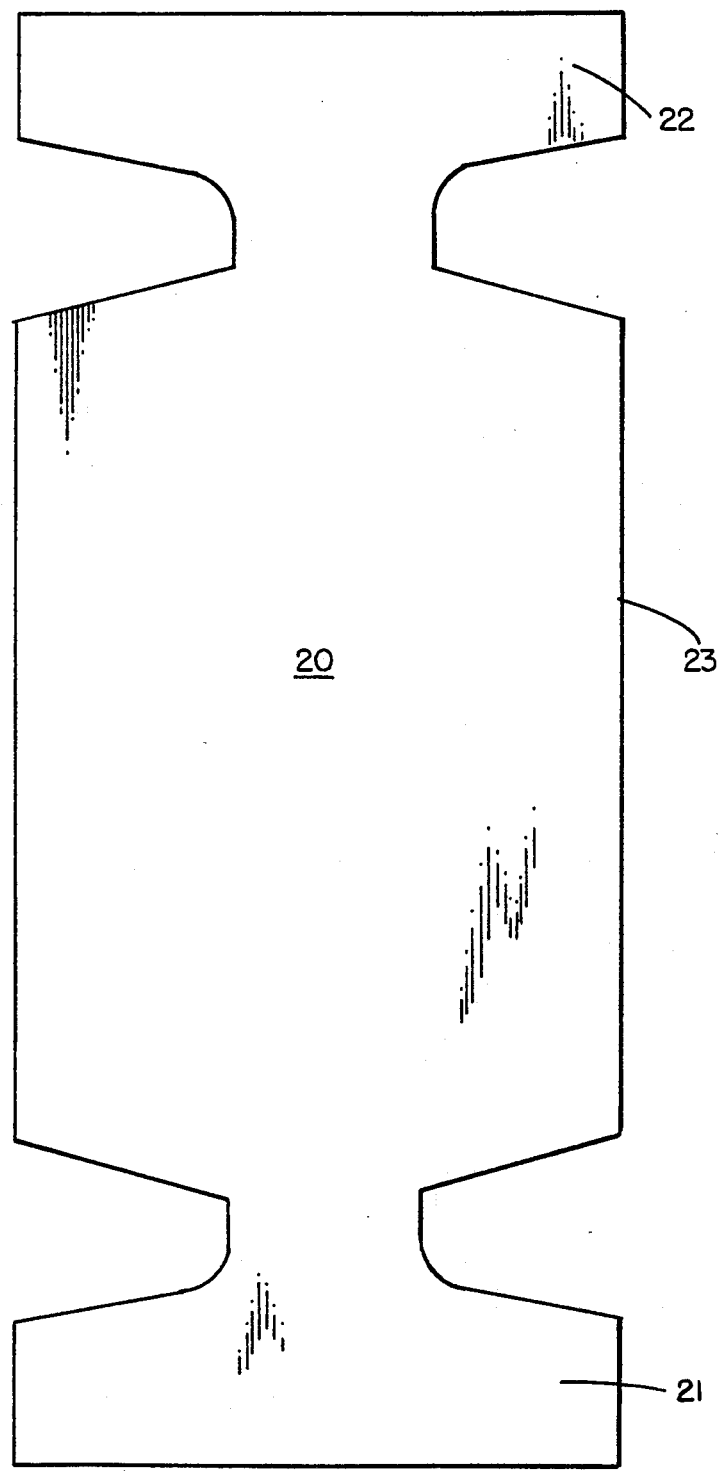
FIG. 6 is an alternative shank for the handset cover of the invention.

In FIG. 6 is illustrated an alternative full wrap shank 20 for use with handset cover 10 instead of shank 16. Full wrap shank 20 may or may not be molded into handset cover 10 as shank 16 preferably is, and full wrap shank 20 need not be attached to the inside of handset cover 10. For instance, full wrap shank 20 can be installed around handset 1 and then handset cover 10 can be installed around the combination of handset 1 and full wrap shank 20. Full wrap shank 20 has a handgrip wrap portion 23, a receiver wrap portion 22, and a transmitter wrap portion 21. The width of full wrap shank 20 and its subportions should be sufficient to wrap around most or all of the circumference of the respective portions of handset 1. Those skilled in the art will appreciate circumstances in which overlap of the respective wrapping portions will better serve. Full wrap shank 20 may be used to good advantage in extremely high risk (that is, areas of frequent and extensive damage to public phone handsets) in order to preserve the service life of the handset at those installations. Full wrap shank 20 together with handset cover 10 will preserve the working of conventional telephone handset 1 even if it has been broken into several pieces. It is contemplated however that this combination of apparatus will be highly effective in preventing breakage of handset 1 in the first instance. Full wrap shank 20 is preferably made of steel, though other malleable metals or even nonmetals may be employed to good effect. Those skilled in the art will appreciate that full wrap shanks may also be molded from high impact plastics and copolymers, such as ABS, in such a way as to permit shank 20 to "snap" into place around handset 1.

Figure 7:
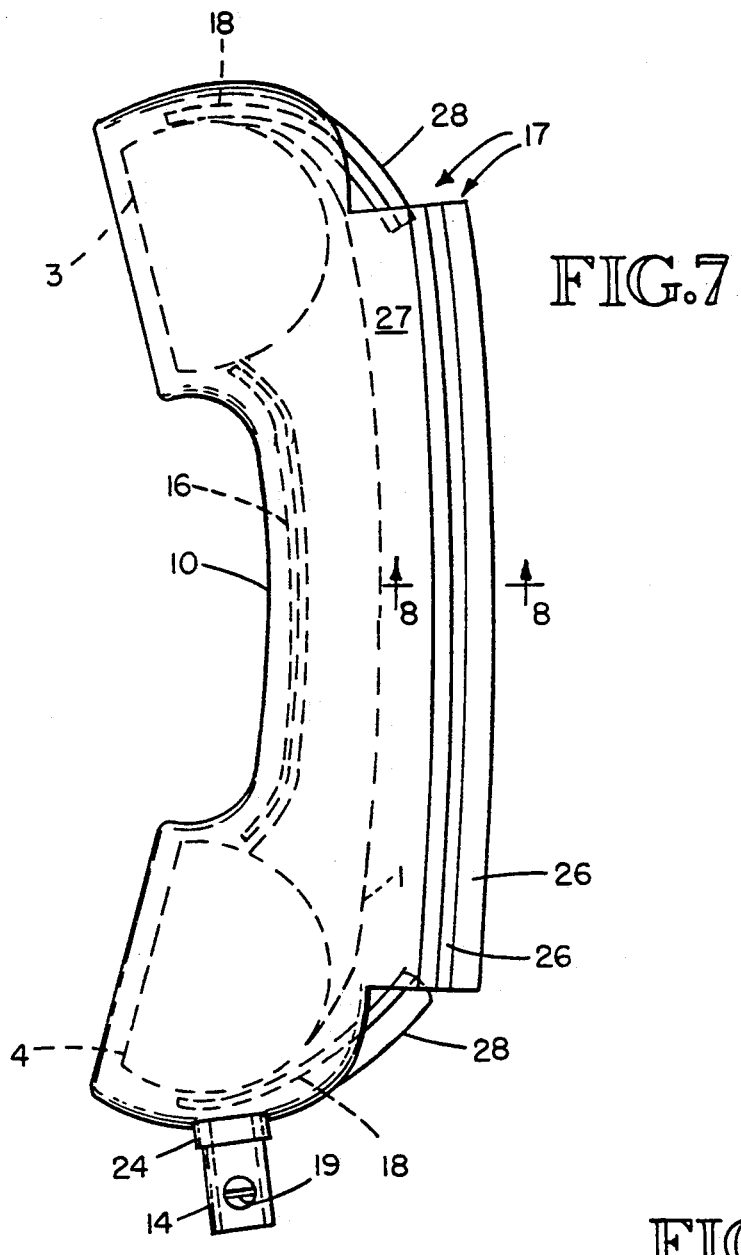
FIG. 7 is a side view of an alternative handset cover with alternative shank and closure configurations.

FIG. 7 illustrates an alternative handset cover 10 which has been formed in one piece. In this embodiment, instead of having closure flaps on the cradle side of handset 1, the closure for the handset cover 10 is on the backside of handset 1. Thus shank 16 is placed at the cradle side of handset 1 and closure shanks 26 are on the backside of handset 1. In addition in this embodiment two end shanks 18 are employed to protect the outside end portions of receiver 3 and transmitter 4 respectively. This embodiment of the handset cover is preferably formed by a conventional injection molding process employing moldable NEOPRENE brand foam rubber as the material of handset cover 10. The molding is carried out in such a way that shank 16, end shanks 18, and closure shanks 26 become molded into handset cover 10. This embodiment also differs from the embodiment shown in FIGS. 1 and 2 in that the receiver and transmitter surfaces are covered as opposed to being left open. This covering over receiver 3 and transmitter 4 may have the same thickness as the rest of handset cover 10, and may be perforated, as will be appreciated by those skilled in the art, with the necessary perforations to facilitate the transmission of sound waves into the transmitter and out of the receiver respectively. Alternatively, the molding process may be set up in such a way that the portion of handset cover 10 covering receiver 3 and transmitter 4 is considerably thinner than the rest of handset cover 10, even to the extent that it would not require any perforations. Also differing from the embodiments shown in FIGS. 1 and 2 is a distinct sleeve boss 24 integrally molded into handset 10 for receiving and supporting cable sleeve 14.

Figure 8:
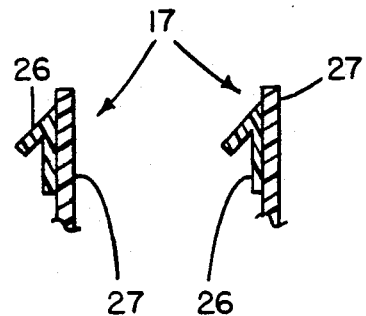
FIG. 8 is a partial sectional view along lines 8—8 of FIG. 7.

As illustrated in FIGS. 7 and 8, upon installation of handset 1 inside handset cover 10, end flaps 28 with their integrally molded end shanks 18 are bent down over the ends of handset 1, and the inner closure flap 27 is folded down over handset 1 and over a portion of the end flaps 28. Finally, the other closure flap 27 is folded down and both closure flaps 27 are stretched so that the angled portions of closure shanks 26 may engage one another to securely close handset cover 10.

Generally, handset cover 10 is installed upon conventional handset 1 as follows: handset cable 2 which depends from handset 1 and has been detached from, or is as yet uninstalled to, the rest of the phone equipment is slipped through cable sleeve 14 from the inside and transmitter 4 is seated within the lower portion of cover 10 by suitable stretching of cover 10 where needed; receiver 3 is then seated with the upper portion of cover 10 by stretching cover 10 around receiver 3; cable 2 is pulled tightly through sleeve 14 and screw 19 is locked down on cable 2; end flaps 28 with end shanks 18 are folded to the surface of handset 1 where they are preferably employed, and closure 17, or alternatively glue strips 15, are sealed around handset 1; where glue strips 15 have been employed, a period of time is allowed to pass for the glue to dry securely; and finally handset cable 2 is attached to the rest of the phone equipment.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

INDUSTRIAL APPLICABILITY

This invention will find use in the communications industry, particularly in public phone booths around the world wherever there is a concern, however slight, that users of the public phone system will cause intentional or unintentional damage to the handset of the telephone. The invention is available in alternate embodiments, each with increasing degrees of security afforded to the handset, so that a stylish and attractive handset cover may be employed in neighborhoods where the risk to damage to the handset is slight, or a rugged extremely secure handset cover where risk of damage to the handset is virtually certain. The handset cover of the invention is reusable, washable, weather resistant, and does not change the normal use of the pay phone. The apparatus of the invention is relatively inexpensive to make and to install; and can be, with the proper tools available to the maintenance person, easily removed for maintenance of the handset. The cost savings to telephone companies throughout the world in handsets which do not need to be replaced because they are not broken, or which can continue to serve their useful function even when they are broken until it is deemed necessary to replace them anyway, will number into the millions of dollars.

We claim:
1. A telephone handset cover comprising:
 (a) a grip cover comprised of an impact energy absorbing material for covering the handgrip portion of a telephone handset;
 (b) two endcovers connected to either end of said grip cover for covering the receiver and transmitter portions of said handset, said endcovers comprised of an impact energy absorbing material and having a groove engaging lip molded therein for secure and correct placement of the handset cover upon said handset; and
 (c) a grip cover closure.

2. The apparatus of claim 1 wherein said grip cover is comprised of a sheet of flexible rubber-like material having a thickness in the range of 1/6" to 3/16" inches.

3. The apparatus of claim 1 further comprising a shank, aid shank integral to the inside surface of said grip cover.

4. The apparatus of claim 3 wherein said shank is comprised of a strip of spring steel.

5. The apparatus of claim 3 wherein said shank is comprised of an impact absorbing fiberglass strip.

6. The apparatus of claim 5 wherein said shank is molded in to said grip cover.

7. The apparatus of claim 1 further comprising a clamp integral to one of said two endcovers for receiving therethrough and for releasably fastening to a handset cable cover of said telephone handset.

8. The apparatus of claim 1 wherein said grip cover is integral with said endcovers and covers substantially all of the handgrip portion of said handset.

9. The apparatus of claim 1, wherein said cover is adhered to said telephone handset with an adhesive.

10. The apparatus of claim 1 wherein said grip cover closure comprises one or more glue strips on one or more flaps of said grip cover, wherein said flaps overlap one another in such a way as to expose at least one of the glue strips to a surface of the other flap whereby a secure closure may be made.

11. The apparatus of claim 10 wherein three glue strips are employed, one on each side of an inner closure flap and one on the inside surface of an outer closure flap.

12. The apparatus of claim 1 wherein said closure comprises an acutely angled edge on the flap edges of left and right flaps of said grip cover, said angled edges disposed on said flap such that overlapping one of said flaps with another by stretching the said overlapping flap places said angled edges into engagement with one another.

13. A telephone handset cover for protecting a telephone handset having a handset body with a transmitter and receiver attached thereto, said handset having a groove interposed between each of said transmitter and receiver and said body, said cover comprising:
  (a) a grip cover comprised of an impact energy absorbing rubber-like material for covering the handgrip portion of a telephone handset;
  (b) two endcovers connected to either end of said grip cover for covering the receiver and transmitter portions of said handset, said endcovers comprised of an impact energy absorbing rubber-like material;
  (c) at least one interior molded lip for engaging one of said grooves between the handset body and the respective transmitter and receiver screw-on caps; and
  (d) a grip cover closure.

14. The apparatus of claim 13 wherein said molded lip comprises an O-ring molded into each of said endcovers.

15. The apparatus of claim 13 further comprising a rigid shank within said cover to strengthen and protect said handset.

16. The apparatus of claim 13 wherein said grip cover closure comprises one or more glue strips on one or more flaps of said grip cover, wherein said flaps overlap one another in such a way as to expose at least one of the glue strips to a surface of the other flap whereby a secure closure may be made.

17. The apparatus of claim 16 wherein three glue strips are employed, one on each side of an inner closure flap and one on the inside surface of an outer closure flap.

18. The apparatus of claim 13 wherein said closure comprises an acutely angled edge on the flap edges of left and right flaps of said grip cover, said angled edges disposed on said flap such that overlapping one of said flaps with another by stretching the said overlapping flap places said angled edges into engagement with one another.

19. The apparatus of claim 15 wherein said shank is comprised of a strip of spring steel.

20. The apparatus of claim 19 wherein said shank is comprised of an impact absorbing fiberglass strip.

21. The apparatus of claim 13 wherein said cover is attached to said handpiece with an adhesive to bond said cover to said handpiece.

* * * * *